United States Patent [19]

Momono et al.

[11] Patent Number: 5,443,317
[45] Date of Patent: Aug. 22, 1995

[54] ROLLING BEARING HAVING BALLS OF DIFFERENT DIAMETERS

[75] Inventors: Tatunobu Momono; Yasushi Mutoh, both of Kanagawa, Japan

[73] Assignee: NSK Ltd., Tokyo, Japan

[21] Appl. No.: 267,237

[22] Filed: Jun. 29, 1994

[30] Foreign Application Priority Data

Jun. 29, 1993 [JP] Japan .................................. 5-182257

[51] Int. Cl.⁶ ............................................. F16C 33/32
[52] U.S. Cl. ...................................... 384/491; 384/450
[58] Field of Search ............... 384/445, 450, 490, 491, 384/494, 548, 565

[56] References Cited

U.S. PATENT DOCUMENTS 3,574,425  4/1971  Johnson ............................. 384/491
4,505,523  3/1985  Stephan ............................. 384/445

*Primary Examiner*—Thomas R. Hannon
*Attorney, Agent, or Firm*—Sughrue, Mion, Zinn, Macpeak & Seas

[57] ABSTRACT

A rolling bearing in which the outer diameter of a first rolling element is different from that of a second rolling element. During the operation of the rolling bearing, the speeds of revolution of the first and second rolling elements are different from each other due to a difference in their outer diameter. The circumferential directions in which the first and second rolling elements move within pockets are opposite to each other, so that a cage is prevented from vibrating with respect to the first and second rolling elements.

3 Claims, 3 Drawing Sheets

ROLLING BEARING HAVING BALLS OF DIFFERENT DIAMETERS

BACKGROUND OF THE INVENTION

The present invention relates to a rolling bearing that is incorporated into various types of machinery to support rotating members such as rotating shafts.

A rolling bearing 1 such as shown in, e.g., FIG. 5 has heretofore been used extensively to support rotating members including rotating shafts. This rolling bearing 1 includes: an outer race 3 having an outer raceway 2 on the inner circumferential surface; an inner race 5 having an inner raceway 4 on the outer circumferential surface; a cage having a plurality of pockets 6, 6 in the circumferential direction; and a plurality of rolling elements 8, 8 which are retained so as to be rollable within the respective pockets 6, 6 and whose rolling surfaces are abutted against the outer raceway 2 and the inner raceway 4. In the conventional rolling bearing the outer diameters of the rolling elements 8, 8 are equal to one another.

To rotatably support, e.g., a rotating shaft within a housing using such rolling bearing 1, the outer race 3 is fitted into and secured to the housing from inside, and the inner race 5 is fitted into and secured to the rotating shaft from outside. When the rotating shaft is caused to rotate under this condition, the inner race 5 rotates inside the outer race 2 based on the rolling of the rolling elements 8, 8 to allow the rotating shaft to rotate within the fixed housing. On the other hand, there is a case where the inner race 5 is fitted into and secured to the outer circumferential surface of the fixed shaft from outside and the outer race 3 is fitted into the inner circumferential surface of a rotor or the like from inside so that the rotor or the like is rotatably supported about the fixed shaft.

The rolling bearing 1 shown in FIG. 5 is a ball bearing using balls as the rolling elements 8, 8. Conventionally, there have also been used rolling bearings using rollers (including tapered rollers and needles) as the rolling elements. While the cage 7 assembled in the rolling bearing 1 of FIG. 5 is a so-called corrugated cage formed by overlapping two elements one upon another, each element being formed by corrugating an annular metal plate, a machined cage 7a such as shown in FIG. 6, which is made of synthetic resin or metal, a crown-shaped cage made of synthetic resin, or a squirrel-cage type retainer (for roller bearings) made of metal or synthetic resin have conventionally been used as cages capable of rollingly retaining the rolling elements 8.

However, the thus constructed and operated conventional rolling bearings 1 address the following problems to be solved. In the conventional rolling bearings 1 the outer diameters of the rolling elements 8, 8 are equal to one another as described above. If the outer diameters of the respective rolling elements 8, 8 are exactly equal to one another, the positional relationship between the respective rolling elements 8, 8 and the pockets 6, 6a of the cages 7, 7a is such as shown in FIG. 6. That is, the distance between the rolling element 8 and the pocket 6a is equal for all the rolling elements 8, 8, which thus imposes no problem. However, it is impossible to make the outer diameters of all the rolling elements 8, 8 exactly the same because of fabrication error that is unavoidable (in other words, size variation per unit container is inevitably present). For example, when JIS class G10 balls whose outer diameter is approximately 2 mm are to be fabricated, variations in outer diameter can be limited to a size variation per unit container of 0.5 μm or less and a diameter variation of 0.25 μm or less, which allowances still brings about some differences.

If the outer diameters of the rolling elements 8, 8 assembled in the rolling bearing 1 vary from one another as described above, the speeds of revolution of the respective rolling elements 8, 8, i.e., the speeds at which the respective rolling elements 8, 8 rotate in the inner race 5 vary due to the size variation per unit container and differences in outer diameter caused by the diameter variation. As a result, the positional relationship between the rolling elements 8, 8 and the pockets 6a, 6a becomes unequal, thereby causing the rolling surfaces of the rolling elements 8, 8 to collide against the inner surfaces of the pockets 6a, 6a irregularly in some cases.

Such irregular collision causes the cages 7, 7a to vibrate depending on how such collision is caused, and produces so-called cage noise. This noise is undesired in that noiseless operation of rotating parts is impaired and unwanted vibrations are produced.

SUMMARY OF THE INVENTION

The rolling bearing of the present invention has been made in view of the above-mentioned circumstances. Similarly to the conventional rolling bearings, a rolling bearing of the present invention includes: an outer race having an outer raceway on an inner circumferential surface thereof; an inner race having an inner raceway on an outer circumferential surface thereof; a cage having a plurality of pockets in the circumferential direction; and a plurality of rolling elements being rollingly retained within the pockets and being abutted against the outer raceway and the inner raceway.

The rolling bearing of the present invention is characterized as follows. The rolling elements include: a plurality of first rolling elements and a plurality of second rolling elements. Each first rolling element has a first outer diameter and each second rolling element has a second outer diameter. The second outer diameter is slightly smaller than the first outer diameter. The first and second rolling elements are arranged substantially at an equal interval in the circumferential direction. A difference between the first outer diameter and the second outer diameter is larger than a variation in the outer diameters of the first and second rolling elements derived from fabrication error.

The rolling bearing of the present invention causes the first and second rolling elements to move toward the ends of the respective pockets based on the difference in outer diameter between the first rolling element and the second rolling element during the rotation of the inner race to the outer race. As a result, there is no likelihood that the rolling surfaces of the rolling elements will irregularly collide against the inner surfaces of the pockets.

The reason therefor will now be described. Assuming that the pitch circle diameter of the rolling element is $d_m$; the outer diameter (diameter) of the rolling element is $D_a$; the angle of contact of the rolling element is $\alpha$; the number of rotation of the inner race is $\eta_i$; the number of rotation of the outer race is $\eta_e$, then the speed of revolution of the rolling element V can be given by the following equation.

$$V=\{(\pi \cdot d_m)/(60\times 10^3)\}\times [\{(1-D_a\cdot\cos\alpha/d_m)\times\eta_i/2\}+(1+D_a\cdot\cos\alpha/d_m)\times\eta_e/2]$$

As is apparent from this equation, when the rolling bearing is used, e.g., with the inner race rotated and the outer race fixed, then the speed of revolution of each rolling element increases with decreasing outer diameter of the rolling element. On the other hand, when the rolling bearing is used, e.g., with the outer race rotated and the inner race fixed, then the speed of revolution of each rolling element increases with increasing outer diameter of the rolling element. When both the inner and outer races are rotated, the magnitude of the speed of revolution of each rolling element is determined in accordance with the speed of rotation thereof.

At any rate, in the rolling bearing of the present invention a difference between the speed of revolution of the first rolling element and that of the second rolling element, which are different from each other, is generated. Based on this difference in speed of revolution, the first rolling element gets abutted against the inner surface of the pocket on one side in the direction of rotation of the cage, whereas the second rolling element gets abutted against the inner surface of the pocket on the other side in the direction of rotation of the cage. The abutment of these rolling elements remain as it is as long as the operation of the rolling bearing continues.

As a result, the rolling surfaces of the rolling elements no longer collide against the inner surfaces of the pockets irregularly, which not only prevents the cage from vibrating, but also prevents noise called cage noise from being produced during the operation of the rolling bearing.

DETAILED DESCRIPTION OF THE PREFERRED EMBODIMENTS

Figure 1:
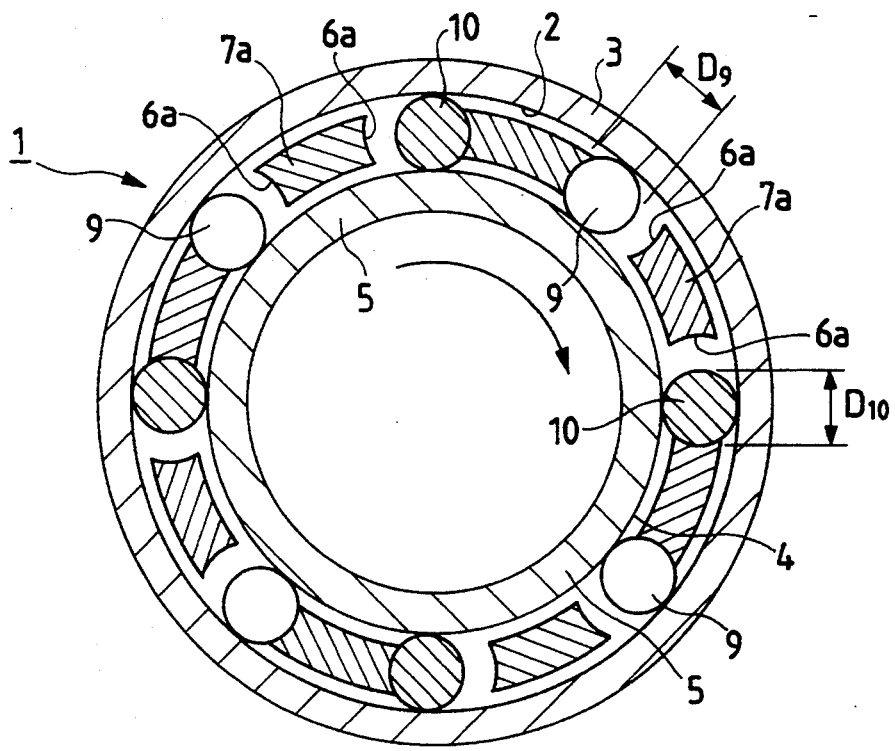
FIG. 1 is a sectional view showing a first embodiment of the present invention.

FIG. 1 shows a first embodiment of the present invention. Parts and components similar to those of the above-mentioned conventional structure are denoted by the same reference numerals and the descriptions thereof will be omitted to avoid duplication. Features of the present invention will now be described.

A cage 7a has eight pockets 6a, 6a in the circumferential direction at an equal interval, and rollingly retains rolling elements 9, 10 in the respective pockets 6a, 6a on a single basis. These eight rolling elements consist of four first rolling elements 9, 9 and four second rolling elements 10, 10. The outer diameter of the first rolling element is different from that of the second rolling element. Each first rolling element 9 indicated by a void in FIG. 1 has a first outer diameter $D_9$, whereas each second rolling element 10 indicated by a cross-hatching of in FIG. 1 has a second outer diameter $D_{10}$. The second outer diameter $D_{10}$ is slightly smaller than the first outer diameter ($D_{10}<D_9$).

The difference ($D_9-D_{10}$) between the first outer diameter $D_9$ and the second outer diameter $D_{10}$ is set to a value greater than the variation in the outer diameters of the respective rolling elements 9, 10 derived from the fabrication error. For example, if a ball whose outer diameter is approximately 2 mm is used as the rolling element as described above and the variation in the outer diameter including size variation per unit container and diameter variation is in the order of 0.1 μm, then the first outer diameter $D_9$ is set to:

$$2\text{ mm}-0.1\text{ μm} \leq D_9 \div 2\text{ mm}+0.1\text{ μm}$$

the second outer diameter $D_{10}$ is set to:

$$1.9998\text{ mm}-0.1\text{ μm} \leq D_{10} < 1.9998\text{ mm}+0.1\text{ μm}$$

As described in the foregoing, the first and second rolling elements 9, 10 having the outer diameters different from each other are retained within the eight pockets 6a, 6a alternately so as to be equidistant in the circumferential direction.

In the thus constructed rolling bearing of the present invention the first and second rolling elements 9, 10 move toward the ends of the respective pockets 6a, 6a based on the difference between the outer diameters ($D_9-D_{10}$) when the inner race 5 rotates relative to the outer race 3. That is, for example, if the rolling bearing is used with the inner race 5 rotated as indicated by the arrow in FIG. 1 and with the outer race 3 fixed, then the speed of revolution of the second rolling elements 10, 10, each having the relatively small second outer diameter $D_{10}$, becomes higher than that of the first rolling elements 9, 9, each having the relatively large first outer diameter $D_9$.

As a result, as shown in FIG. 1, the first rolling elements 9, 9 are abutted against the inner surfaces of the pockets 6a, 6a on the upstream side as viewed in the direction of rotation of the cage 7a, whereas the respective second rolling elements 10, 10 are abutted against the inner surfaces of the pockets 6a, 6a on the downstream side as viewed in the direction of rotation of the cage 7a, respectively. The abutment between the rolling elements 9, 10 and the inner surfaces of the pockets 6a, 6a is kept as shown in FIG. 1 as long as the rolling bearing is being operated. That is, during the operation of the rolling bearing, the first rolling elements 9, 9 tend to push the cage 7a in the counterclockwise direction as viewed in FIG. 1, whereas the second rolling elements 10, 10 tend to push the cage 7a in the clockwise direction as viewed in FIG. 1. As a result, the cage 7a is free from play with respect to the first and second rolling elements 9, 10.

Hence, the rolling surfaces of the rolling elements 9, 10 do not collide against the inner surfaces of the pockets 6a, 6a irregularly any more, which in turn does not cause the cage 7a to vibrate during the operation of the rolling bearing with no noise called cage noise produced.

It is preferred that the difference ($D_9-D_{10}$) between the first outer diameter $D_9$ and the second outer diameter $D_{10}$ be minimized as long as the condition $D_{10}<D_9$ is satisfied. The reason therefor is to prevent the force exerted in the circumferential direction of the cage 7a from being too large based on the difference in the speed of revolution between the rolling elements 9 and 10 as well as to prevent the load applied to the rolling elements 9, 9 having the larger outer diameter from being too large.

Figure 2:
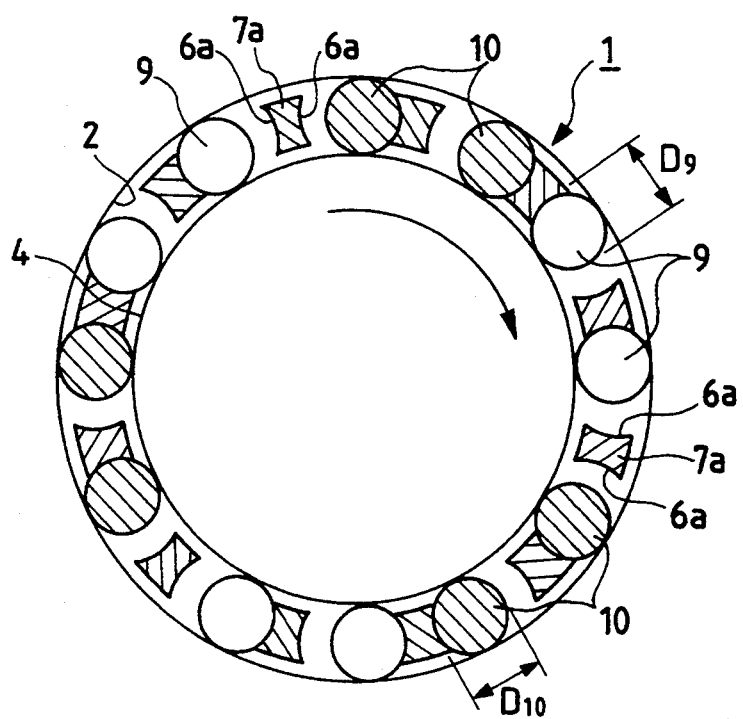
FIG. 2 is a sectional view showing a second embodiment of the present invention in which a part of components is omitted.

FIG. 2 shows a second embodiment of the present invention. In this embodiment the cage 7a has twelve pockets 6a, 6a with six first rolling elements 9, 9 and six second rolling elements 10, 10. A pair of rolling elements 9, 9 alternates with a pair of rolling elements 10, 10. Other structural aspects and mode of operation are similar to those of the first embodiment.

Figure 3:
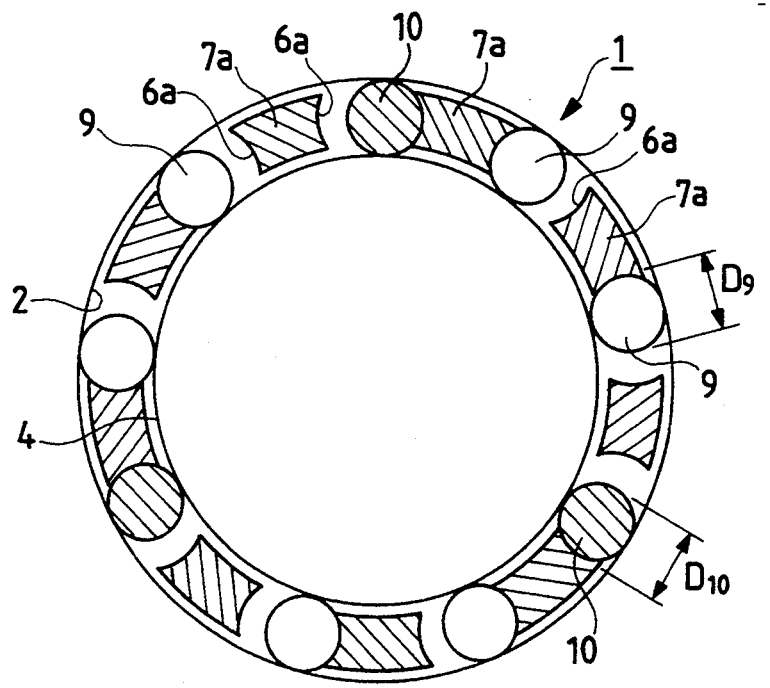
FIG. 3 is a sectional View showing a third embodiment of the present invention in which a part of components is omitted.

FIG. 3 shows a third embodiment of the present invention. In this embodiment the cage 7a has nine pockets 6a, 6a with six first rolling elements 9, 9 and three second rolling elements 10, 10. A pair of first rolling elements 9, 9 alternates with a single second rolling element 10 in the circumferential direction. Other structural aspects and mode of operation are similar to those of the first embodiment.

Figure 4:
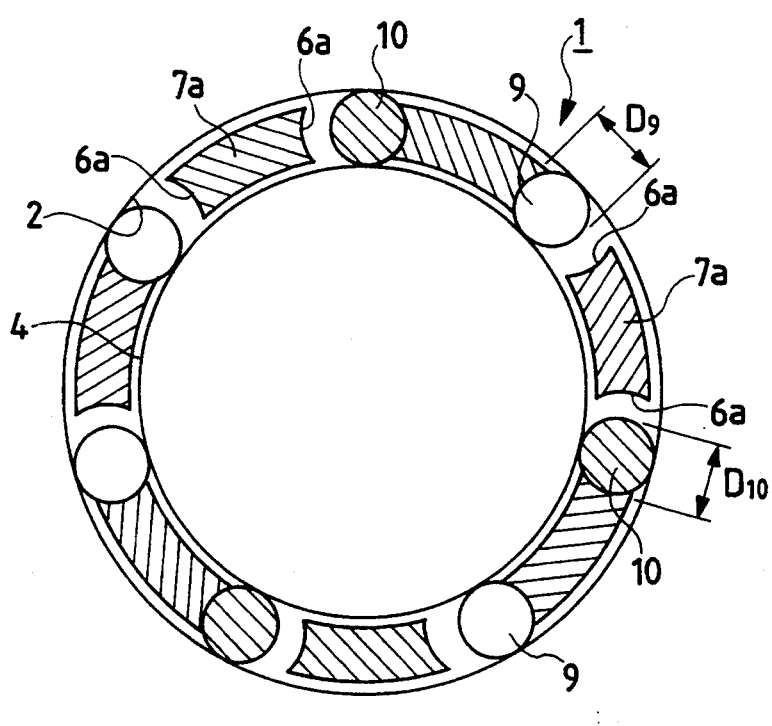
FIG. 4 is a sectional view showing a fourth embodiment of the present invention in which a part of components is omitted.
Figure 5:
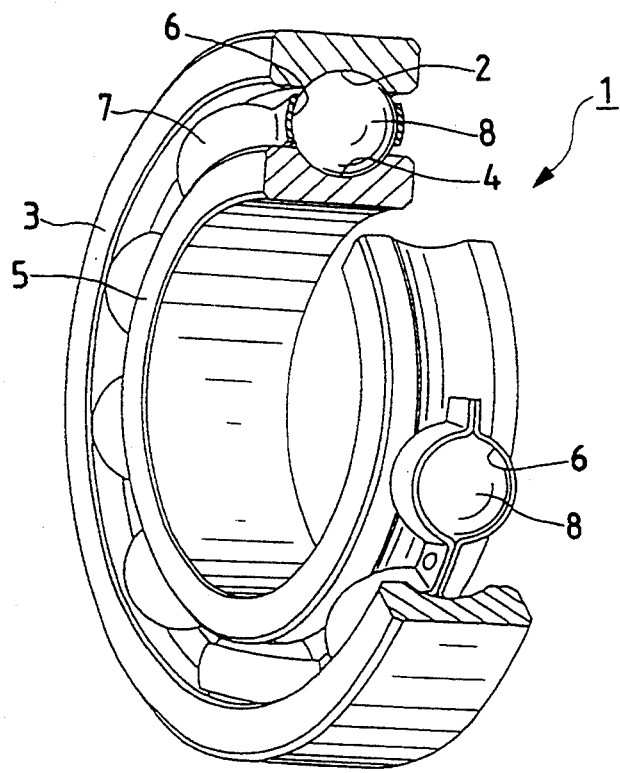
FIG. 5 is a partially broken perspective view showing an example of a rolling bearing to which the present invention is applied.
Figure 6:
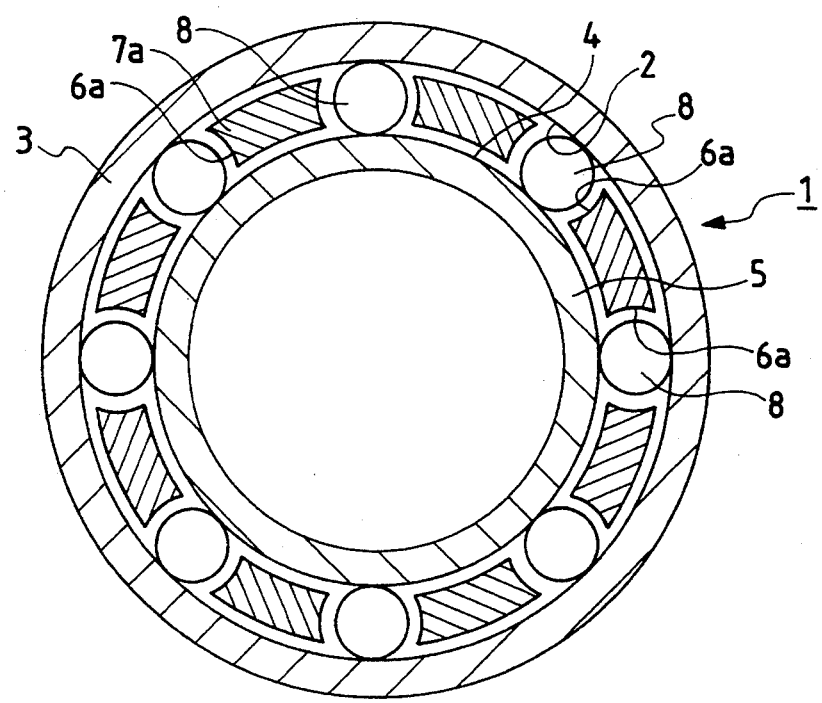
FIG. 6 is a sectional view showing a conventional rolling bearing.

FIG. 4 shows a fourth embodiment of the present invention. In this embodiment the cage 7a has seven pockets 6a, 6a with four first rolling elements 9, 9 and three second rolling elements 10, 10. Except for a pair of first rolling elements 9, 9 disposed at only one portion, the first rolling element 9 alternates with the second rolling element 10 one by one in the circumferential direction. Other structural aspects and mode of operation are similar to those of the first embodiment.

The present invention is applicable to a variety of rolling bearings, not only to ball bearings but also to roller bearings and the like. Furthermore, the present invention is applicable not only to radial rolling bearings but also thrust rolling bearings.

As a result of the above-mentioned construction and operation of the rolling bearings of the present invention, generation of cage noise can be prevented so that noiseless, less vibrating, and high-performance rolling bearings can be provided.

What is claimed is:

1. A rolling bearing comprising:
   an outer race including an outer raceway on an inner circumferential surface thereof;
   an inner race including an inner raceway on an outer circumferential surface thereof;
   a cage including a plurality of pockets in the circumferential direction; and
   a plurality of rolling elements being rollingly retained within the pockets, each of the rolling elements being abutted against the outer raceway at a predetermined angle of contact, and the inner raceway, and the rolling elements comprising a plurality of first and second rolling elements, each of the first rolling elements having a first outer diameter, and each of the second rolling elements having a second outer diameter which is smaller than the first outer diameter,
   wherein a difference between the first outer diameter and the second outer diameter is larger than a variation in outer diameters of the first and second rolling elements derived from fabrication error,
   wherein the inner and outer raceways comprise curved surfaces in the axial direction which substantially correspond to an outer surface of the rolling element.

2. The rolling bearing of claim 1, wherein when the inner race is rotated and the outer race is fixed during the operation of the rolling bearing, the first rolling elements are abutted against inner surfaces of the pockets on upstream sides as viewed in the direction of rotation of the cage, and the respective second rolling elements are abutted against inner surfaces of the pockets on downstream sides as viewed in the direction of rotation of the cage, respectively.

3. The rolling bearing of claim 1, wherein the first and second rolling elements are arranged substantially at an equal interval in the circumferential direction.

* * * * *